US012730232B2

(12) United States Patent
Herrmann

(10) Patent No.: US 12,730,232 B2
(45) Date of Patent: Sep. 8, 2026

(54) PULSE SHAPER CIRCUIT

(71) Applicant: KONINKLIJKE PHILIPS N.V., Eindhoven (NL)

(72) Inventor: Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 103 days.

(21) Appl. No.: 18/283,095

(22) PCT Filed: Mar. 17, 2022

(86) PCT No.: PCT/EP2022/056954
§ 371 (c)(1),
(2) Date: Sep. 20, 2023

(87) PCT Pub. No.: WO2022/200161
PCT Pub. Date: Sep. 29, 2022

(65) Prior Publication Data

US 2024/0168179 A1 May 23, 2024

(30) Foreign Application Priority Data

Mar. 22, 2021 (EP) .................................... 21163924

(51) Int. Cl.
*G01T 1/17* (2006.01)
*G01T 1/24* (2006.01)
*G01T 1/29* (2006.01)

(52) U.S. Cl.
CPC .............. *G01T 1/171* (2013.01); *G01T 1/247* (2013.01); *G01T 1/2928* (2013.01)

(58) Field of Classification Search
CPC .......... G01T 1/17; G01T 1/247; G01T 1/2928
See application file for complete search history.

(56) References Cited

U.S. PATENT DOCUMENTS 9,335,424 B2 5/2016 Herrmann
10,996,351 B2 5/2021 Steadman Booker
(Continued)

FOREIGN PATENT DOCUMENTS

JP 2010008176 A 1/2010
WO WO2008155680 A2 12/2008
WO WO2018185118 A1 10/2018

OTHER PUBLICATIONS

PCT International Search Report, International application No. PCT/EP2022,056954, Jul. 1, 2022.
(Continued)

*Primary Examiner* — Blake C Riddick
(74) *Attorney, Agent, or Firm* — Larry Liberchuk

(57) ABSTRACT

A pulse shaper circuit (200) for use in a spectral photon counting detector (120) includes an integrator (210) and a reset circuit (230). The integrator (210) includes an output (220) that generates an output pulse (V(t))) having an amplitude ($V_{peak}$) indicative of an energy of a detected photon. The reset circuit (230) discharges the integrator (210) a first time period ($DT_1$) after the output (220) of the integrator (210) exceeds a first threshold value ($V_1$). The reset circuit (230) also discharges the integrator (210) if the output (220) of the integrator (210) exceeds an initial threshold value ($V_0$), which is lower than the first threshold value ($V_1$), and does not subsequently exceed the first threshold value ($V_1$) within a predetermined time interval ($DT_0$) after the initial threshold value ($V_0$) is exceeded.

13 Claims, 3 Drawing Sheets

(56) References Cited

U.S. PATENT DOCUMENTS 11,681,053 B1 * 6/2023 Bell .......................... G01J 1/44 250/370.14
2006/0012250 A1 * 1/2006 Ouvrier-Buffet ......... G01T 1/17 307/106
2008/0316347 A1 12/2008 Gamal
2009/0008564 A1 * 1/2009 Balan .................... G01T 1/1644 250/366
2010/0187432 A1 * 7/2010 Herrmann ............ H04N 25/773 250/336.1
2010/0193700 A1 * 8/2010 Herrmann ............... G01T 1/171 250/336.1
2011/0036989 A1 2/2011 Marks
2014/0284492 A1 * 9/2014 Han ..................... H04N 25/773 250/394
2015/0063527 A1 * 3/2015 Daerr ..................... A61B 6/482 378/5
2015/0063533 A1 * 3/2015 Proksa .................... G01T 1/171 378/19
2015/0085985 A1 * 3/2015 Funaki .................. H03M 1/145 378/98
2015/0309188 A1 * 10/2015 Roessl .................... G01T 1/171 250/336.1
2016/0238717 A1 8/2016 Abraham
2016/0313457 A1 * 10/2016 Abraham .............. G01T 1/2985
2018/0196149 A1 * 7/2018 Blevis ..................... G01T 1/243
2018/0209765 A1 * 7/2018 Titus ......................... F41G 7/26
2018/0252822 A1 * 9/2018 Svensson .................. G01T 1/18
2019/0378682 A1 12/2019 Wang
2020/0064500 A1 * 2/2020 Steadman Booker ....................... H03K 5/1532
2020/0326437 A1 * 10/2020 Steadman Booker .... G01T 1/17

OTHER PUBLICATIONS

Kruger H. et al., "CIX—A Detector for Spectral Enhanced X-Ray Imaging by Simultaneous Counting and Integrating", Proceedings of SPIE—The International Society for Optical Engineering 6913, Feb. 2008.

Kraft E. et al., "Counting and Integrating Readout for Direct Conversion X-ray Imaging—Concept, Realization and First Prototype Measurements", IEEE Transactions on Nuclear Science, vol. 54, issue 2, pp. 383-390, Apr. 2007.

Knoll G. et al., "Radiation Detection and Measurement", J. Wiley, Chapter 17, pp. 628-629, 2010.

Krummenacher, F. et al., "Pixel Detectors with Local Intelligence: An IC Designer Point of View", Nuclear Instruments and Methods in Physics Research, vol. 305, issue 3, pp. 527-532, 1991.

* cited by examiner 100
110
130
120
140
150

200
230
ΔT1
ΔT0
SW1
210
Cf
220
in
out
V0
V1
Vref
250
CET1
CETN
VET1
VETN
240

PULSE SHAPER CIRCUIT

TECHNICAL FIELD

The disclosure relates to a pulse shaper circuit for use in a spectral photon counting detector. A spectral photon counting detector that includes the pulse shaper circuit, a computed tomography and an X-ray imaging system that include the spectral photon counting detector, and a pulse shaping method, are also disclosed.

BACKGROUND

Spectral photon counting detectors are used in both computed tomography "CT" and X-ray imaging systems to distinguish between the energies of detected X-ray photons, or "quanta". Images generated using imaging systems that employ a spectral photon counting detector, permit distinctions to be made between materials that have similar X-ray attenuation values, and which when measured using a conventional detector that detects X-ray photons within only a single energy interval, or by just integrating the photon energies of all photons observed during an X-ray image frame, may be indistinguishable. Spectral photon counting detectors are already used or are expected to be used in both CT and X-ray imaging systems in the medical field, in the materials analysis field, and in other application fields such as baggage scanning.

Spectral photon counting detectors operate by determining a count of the numbers of received X-ray photons within a plurality of X-ray energy intervals. Spectral photon counting detectors that are based on direct-conversion materials such as cadmium telluride, cadmium zinc telluride "CZT", and silicon, typically employ a pulse shaper circuit that detects the charge generated in the direct-conversion material in response to the received X-ray photons. The pulse shaper circuit typically employs an integrator, which integrates the charge generated by each received X-ray photon. The result of the integration is an output pulse having an amplitude that is indicative of the energy of the X-ray photon. An energy discriminator circuit coupled to the output of the pulse shaper circuit compares the height of the output pulse with one or more X-ray energy thresholds, and a photon counter circuit counts, for each energy threshold, the number of times the leading edge of the output pulse crosses the threshold. An energy binning circuit bins the photon counts into energy ranges, thereby spectrally resolving the detected X-ray radiation.

In order to obtain an accurate measurement of the energy of an X-ray photon, it is important that the integrator in the pulse shaper circuit is fully discharged prior to integrating the charge generated by the photon. This is achieved by discharging the integrating, or "feedback" capacitor in the integrator. An offset at the output of the integrator that exists prior to integrating the charge generated by the photon would otherwise result in a corresponding offset in the measured X-ray energy. The presence of such offsets is often referred to as the "pedestal effect". Spatial variations in the offset values across a pixelated array of detector elements also lead to X-ray image artifacts.

A document WO 2008/155680 A2 discloses an apparatus includes an integrator that produces a pulse having a peak amplitude indicative of the energy of a detected photon. First discharging circuitry discharges the integrator at a first discharging speed, and second discharging circuitry discharges the integrator at a second discharging speed. The first discharging speed is less than the second discharging speed.

In principle it may be possible to compensate for a constant offset value in the output of the pulse shaper circuit. However, the value of this offset is difficult to predict. Consequently, there remains room to improve the way in which pulse shaper circuits are reset in spectral photon counting detectors.

SUMMARY

In accordance with one aspect of the disclosure, a pulse shaper circuit for use in a spectral photon counting detector, is provided. The pulse shaper circuit includes an integrator and a reset circuit. The integrator comprises an output configured to generate an output pulse having an amplitude indicative of an energy of a detected photon. The reset circuit is configured to discharge the integrator a first time period after the output of the integrator exceeds a first threshold value. The reset circuit is further configured to discharge the integrator if the output of the integrator exceeds an initial threshold value, which is lower than the first threshold value, and does not subsequently exceed the first threshold value within a predetermined time interval after the initial threshold value is exceeded.

A spectral photon counting detector, a computed tomography imaging system, an X-ray imaging system, and a pulse shaping method are provided in accordance with other aspects of the disclosure.

Further aspects, features and advantages of the disclosure will become apparent from the following description of examples, which is made with reference to the accompanying drawings.

DETAILED DESCRIPTION

Examples of the present disclosure are provided with reference to the following description and the figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to the examples of a pulse shaper circuit, may also be provided in a spectral photon counting detector, or in a computed tomography or X-ray imaging system, or in a pulse shaping method, in a corresponding manner.

In the description, reference is made to a pulse shaper circuit for use in a spectral photon counting detector. Reference is made to the use of the pulse shaper circuit and the spectral photon counting detector in X-ray and computed tomography imaging systems in the medical field. However, it is to be appreciated that the pulse shaper circuit, the spectral photon counting detector, and the X-ray and computed tomography imaging systems described herein also find application in other fields than the medical field. For example, they may also be used in the materials analysis field, the baggage scanning field, and also in other application fields.

Figures 1, 2:
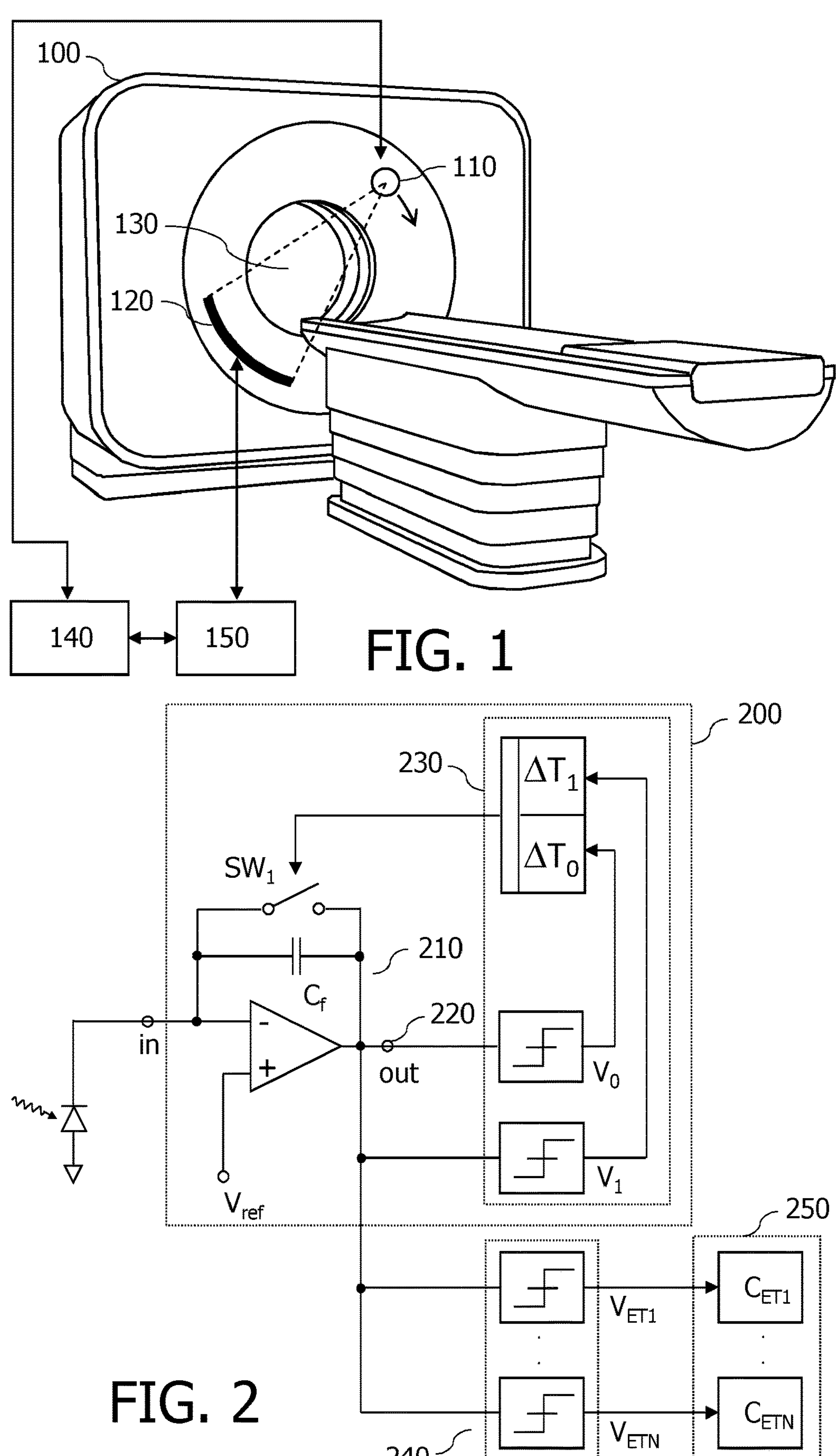
FIG. 1 is a schematic diagram illustrating a computed tomography imaging system 100 including a spectral photon counting detector 120.
FIG. 2 is a schematic diagram illustrating a first example of a pulse shaper circuit 200, in accordance with some aspects of the disclosure.

FIG. 1 is a schematic diagram illustrating a computed tomography imaging system 100 including a spectral photon counting detector 120. The computed tomography imaging system 100 includes an X-ray source 110. In FIG. 1, the X-ray source 110 and the spectral photon counting detector 120 are separated by an imaging region 130 in order to generate X-ray image data representing the attenuation of X-rays passing through the imaging region 130 between the X-ray source 110 and the spectral photon counting detector 120. An object, for example a portion of a human subject, may be disposed in the imaging region in order to determine the attenuation of X-rays passing through the object in the imaging region 130.

In-use, the X-ray source 110 and the spectral photon counting detector 120 are rotated by various motors (not illustrated) around the imaging region 130 whilst generating spectral image data representing the attenuation of X-rays in the imaging region 130 in multiple X-ray energy intervals. The rotation of the X-ray source 110 and the spectral photon counting detector 120, and the generation of X-rays by the X-ray source 110, are controlled by an imaging system controller 140. The spectral image data is transmitted to an image reconstruction controller 150, which applies various image reconstruction techniques to the spectral image data in order to reconstruct a three- or two-dimensional spectral image representing the attenuation of the X-rays in the imaging region 130. The operations of the imaging system controller 140 and the image reconstruction controller 150, may be provided by one or more processors. The spectral images may then be displayed on a display (not illustrated). The spectral images generated by the computed tomography imaging system 100 may be used to image regions of a patient as part of a medical investigation.

Spectral photon counting detectors operate by determining a count of the numbers of detected X-ray photons within a plurality of X-ray energy intervals. The X-ray photons are detected by a pixelated array of X-ray detector elements (not illustrated in FIG. 1). The pixelated array may be one- or two-dimensional. Spectral photon counting detectors typically include X-ray detector elements that are formed from direct-conversion materials such as cadmium telluride, cadmium zinc telluride "CZT", and silicon. For some applications, GaAs is considered. Direct-conversion materials such as these generate electrical pulses in response to received X-ray photons. Spectral photon counting detectors typically employ a pulse shaper circuit that determines the amount of charge generated by the direct-conversion material in response to each received X-ray photon. The pulse shaper circuit typically employs an integrator, which integrates the charge generated by each received X-ray photon. In so doing, the integrator generates an output pulse having an amplitude that is indicative of the energy of the X-ray photon. An energy discriminator circuit coupled to the output of the pulse shaper circuit includes a comparator circuit and a counter circuit. The comparator circuit compares the height of the output pulse with one or more X-ray energy thresholds, and the counter circuit counts for each energy threshold the number of times the leading edge of the output pulse crosses the threshold. In so doing, the energy discriminator circuit spectrally resolves the detected X-ray radiation.

Spectral photon counting detectors that employ pulse shaper circuits may be incorporated into an X-ray imaging system in a similar manner to the above-described CT imaging system 100. In contrast to a CT imaging system, an X-ray imaging system generates planar images. In an X-ray imaging system, the X-ray source and detector are similarly separated by an imaging region 130. However, in an X-ray imaging system the X-ray source and detector typically remain static whilst image data is generated. In a medical X-ray imaging system, the X-ray source and the detector are typically mechanically coupled to a support structure, the orientation of which may be adjusted prior to the generation of X-ray image data in order to obtain a spectral X-ray image of the body from a desired orientation. Medical X-ray imaging systems that include support structures in the form of a C-arm, an O-arm, and other shapes, are known.

The inventor has determined that existing pulse shaper circuits that are used in spectral photon counting detectors may suffer from offsets. These offsets degrade the accuracy of measuring the energy of X-ray photons, and thus impact the quality of the resulting spectral X-ray images.

FIG. 2 is a schematic diagram illustrating a first example of a pulse shaper circuit 200, in accordance with some aspects of the disclosure. The pulse shaper circuit 200 may be used in a spectral photon counting detector 120, and includes:

- an integrator 210 comprising an output 220 configured to generate an output pulse V(t) having an amplitude $V_{peak}$ indicative of an energy of a detected photon;
- a reset circuit 230 configured to discharge the integrator 210 a first time period $DT_1$ after the output 220 of the integrator 210 exceeds a first threshold value $V_1$; and
- wherein the reset circuit 230 is further configured to discharge the integrator 210 if the output 220 of the integrator 210 exceeds an initial threshold value $V_0$, which is lower than the first threshold value $V_1$, and does not subsequently exceed the first threshold value $V_1$ within a predetermined time interval $DT_0$ after the initial threshold value $V_0$ is exceeded.

With reference to FIG. 2, in the illustrated example, the integrator 210 is provided by an operational amplifier having a feedback capacitor, Cf, coupled between the output of the operational amplifier, labelled "out", and the inverting input of the operational amplifier, labelled "–". The inverting input of the operational amplifier serves as the input to the integrator, and is labelled "in". The output of the operational amplifier serves as the output 220 of the integrator 210. The feedback capacitor $C_f$ is therefore coupled between the output 220 of the integrator 210 and the input of the integrator 210. The non-inverting input of the operational amplifier, labelled "+", is coupled to a reference voltage, $V_{ref}$. The input to the integrator may be coupled to an X-ray detector element, as indicated by the X-ray sensitive photodiode symbol on the left side of FIG. 2.

The X-ray detector element illustrated in FIG. 2 comprises a direct-conversion material. When an X-ray photon is received in a direct-conversion material, a charge cloud is generated. The amount of charge in the charge cloud depends on the energy of the received X-ray photon. The charge in the charge cloud is collected by applying a bias voltage across electrical terminals disposed on the material, and may be detected as electrical pulse. The X-ray detector element illustrated in FIG. 2 may comprise a direct conversion material such as cadmium telluride, or cadmium zinc telluride "CZT", or silicon, or another direct conversion material that results in the generation of an electrical pulse in response to a received X-ray photon. The electrical pulse that is generated by the X-ray detector element in FIG. 2, is integrated by the integrator 210. The integrator 210 consequently generates an output pulse, V(t), at its output 220, and the amplitude of the output pulse V(t) is indicative of the energy of the detected photon.

Figures 3, 4:
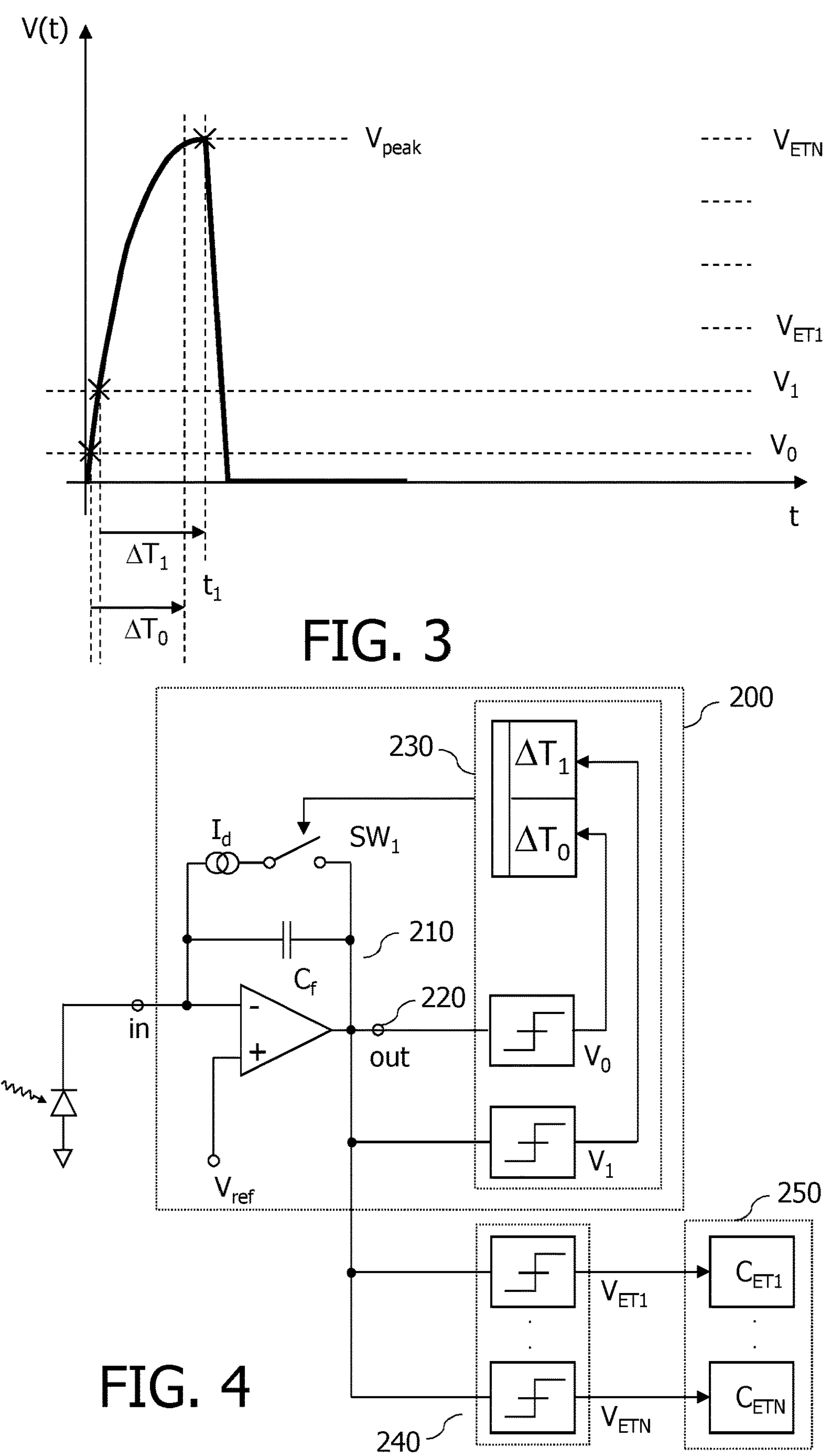
FIG. 3 is a graph illustrating an output pulse V(t) generated by an integrator 210 of a pulse shaper circuit 200, in accordance with some aspects of the disclosure.
FIG. 4 is a schematic diagram illustrating a second example of a pulse shaper circuit 200, in accordance with some aspects of the disclosure.

FIG. 3 is a graph illustrating an output pulse V(t) generated by an integrator 210 of a pulse shaper circuit 200, in accordance with some aspects of the disclosure. With reference to FIG. 3, an X-ray photon is received by the X-ray detector element at a time corresponding to the origin of the graph. The resulting electrical pulse that is generated by the X-ray detector element, i.e. the current pulse that results from the charge cloud generated in the direct conversion material, is integrated by the integrator 210, and its output pulse V(t) increases in value until substantially all the charge from the charge cloud is integrated. At this time, $t_1$, the output pulse V(t) has a maximum value, $V_{peak}$. This maximum value $V_{peak}$ represents the energy of the received X-ray photon. The energy of the received X-ray photon may be determined at time $t_1$, for example by using the comparator circuit 240 and the counter circuit 250, illustrated in FIG. 2, and as described below in more detail.

As indicated schematically in FIG. 2 by the symbol $DT_1$, the comparator symbol with threshold value $V_1$, and the switch $SW_1$, the reset circuit 230 discharges the integrator 210 a first time period $DT_1$ after the output 220 of the integrator 210 exceeds the first threshold value $V_1$. This is referred-to herein as discharging the integrator 210 under condition i). The rate at which the integrator is discharged, i.e. the rate at which the output pulse V(t) in FIG. 3 decays, is determined in-part by the on-state series resistance of the switch $SW_1$. It is desirable to make this rate of decay high in order to quickly prepare the integrator 210 for integrating the electrical pulse from a subsequently-received X-ray photon, and thus reduce the chance of pile-up.

In some examples, the first time period $DT_1$ corresponds to the peak of the output pulse V(t). In other words, the reset circuit 230 discharges the integrator 210 at time $t_1$ in FIG. 3. In other examples, the first time period $DT_1$ is predetermined and corresponds approximately to the peak of the output pulse V(t). It is noted that the time of the peak may vary. For example, the time of the peak may depend on the energy of the received X-ray photon. In the former examples, i.e. the first time period $DT_1$ corresponds to the peak of the output pulse V(t), a peak detection circuit may be used to detect the peak of the output pulse V(t), and to generate a reset pulse that closes the switch $SW_1$ in FIG. 2 at the time of the peak, thereby coupling the terminals of the feedback capacitor $C_f$ together and discharging the integrator 220. In the former examples, the first time period $DT_1$ represents a time at which the output 220 of the integrator 210 reaches the maximum value $V_{peak}$. The discharging of the integrator 210 in FIG. 3 in this manner is illustrated in FIG. 3 by way of the decay of the signal V(t) after time $t_1$. An example of a peak detection circuit that may be used for this purpose is illustrated in FIG. 2 of document WO 2018/185118 A1.

In the latter examples, i.e. the first time period $DT_1$ is predetermined, a timer circuit such as a monostable may be used to generate a reset pulse a predetermined time period $DT_1$ after the first threshold value $V_1$ is exceeded. The reset pulse closes the switch $SW_1$ in FIG. 2, thereby coupling the terminals of the feedback capacitor $C_f$ together and discharging the integrator 220. As illustrated in the reset circuit 230 in FIG. 2, in one example, a comparator with a threshold value that is equal to the first threshold value $V_1$ may be used to monitor the output 220 of the integrator 210 and trigger a monostable to generate the reset pulse the predetermined time period $DT_1$ after the first threshold value $V_1$ is exceeded. The predetermined time period $DT_1$ may be set to a value that is sufficiently long to encompass the expected duration of a current pulse arising from the detection of an X-ray photon by the X-ray detector element. This allows the integrator to reach the peak amplitude, $V_{peak}$, by integrating substantially all of the charge generated by the received X-ray photon.

As illustrated in FIG. 2, the reset circuit 230 may include a switch $SW_1$ for coupling the output 220 of the integrator 210 to the input of the integrator 210 in order to discharge the integrator 210. The closing of the switch $SW_1$ may be controlled by the reset pulse as described in the examples above. The switch $SW_1$ may be provided by one or more transistors. For example, the switch $SW_1$ may be provided by one or more field effect transistors "FETs" such as a MOSFET or a JFET, or by one or more bipolar transistors. In an alternative implementation, the reset circuit 230 may include a current source.

An alternative implementation that uses a current source to discharge the integrator is described with reference to FIG. 4 which is a schematic diagram illustrating a second example of a pulse shaper circuit 200, in accordance with some aspects of the disclosure. In FIG. 4, current source $I_d$ injects a charge into the feedback capacitor $C_f$ in order to discharge the integrator 210. This implementation is described with reference to FIG. 4, Features that are labelled with the same labels in FIG. 4 corresponds to the features described above with reference to FIG. 2. As in FIG. 2, the FIG. 4 implementation includes a switch $SW_1$, the operation of which is controlled by a reset pulse as described above. When the switch $SW_1$ closes, current from the current source $I_d$ is injected into the feedback capacitor $C_f$ in order to discharge the integrator 210. The current source $I_d$ acts to discharge the integrator 210 in a controlled manner. For example, the current source $I_d$ may include a constant current source. Alternative switchable current sources to the one illustrated in FIG. 4 may also be used and controlled by the reset pulse in a similar manner.

As indicated schematically by the symbol $DT_0$ and the comparator symbol with threshold value $V_0$ in FIG. 2, and FIG. 4, the reset circuit 230 is also configured to discharge the integrator 210 if the output 220 of the integrator 210 exceeds an initial threshold value $V_0$, which is lower than the first threshold value $V_1$, and the output 220 of the integrator 210 does not subsequently exceed the first threshold value $V_1$ within a predetermined time interval $DT_0$ after the initial threshold value $V_0$ is exceeded. This is referred-to herein as discharging the integrator 210 under condition ii), and the effect of this is to reduce the value of the offset that may be present at the output of the integrator prior to the integrator integrating the current pulse from a received X-ray photon. Example reasons for such offsets are given below. Such offsets degrade the accuracy of measuring the energy of X-ray photons, and thus impact the quality of the resulting spectral X-ray images.

In one example, the discharging of the integrator 210 under condition ii) may be implemented by using a comparator with a threshold value that is equal to the initial threshold value $V_0$ to monitor the output 220 of the integrator 210 and to trigger a monostable to generate an output pulse with a logic high value after a delay that is equal to the predetermined time interval $DT_0$. A logic AND operation between this output pulse and the logic INVERSE of the output of the above-described comparator with a threshold value that is equal to the first threshold value $V_1$, may be used to generate a signal, which when logic OR'd with the logic value of the reset pulse described above (and which is generated at a time corresponding to the predetermined time period $DT_1$ after the first threshold value $V_1$ is exceeded), causes the switch $SW_1$ in FIG. 2 to close. The result of this is to discharge the integrator 210 under condition i) i.e. a first time period $DT_1$ after the output 220 of the integrator 210 exceeds the first threshold value $V_1$. It also discharges the integrator 210 under condition at the end of the predetermined time interval $DT_0$ under condition ii) i.e. if the output 220 of the integrator 210 exceeds the initial threshold value $V_0$, and does not subsequently exceed the first threshold value $V_1$ within the predetermined time interval $DT_0$ after the initial threshold value $V_0$ is exceeded.

Thus, the reset circuit 230 causes the integrator 210 to be discharged under condition ii) if at the end of the predetermined time interval $DT_0$ there is an offset at its output that is between the initial threshold value $V_0$ and the first threshold value $V_1$. The origin of such offsets is likely to be noise, or a low energy X-ray photon that has not caused the first threshold value $V_1$ to be exceeded. Such offsets that do not cause the first threshold value $V_1$ to be exceeded, affect the measured energy of a subsequently-detected X-ray photon that does cause the first threshold value $V_1$ to be exceeded. Consequently, the reset circuit 230 provides a pulse shaper circuit that has improved X-ray energy measurement accuracy.

Alternative circuits to those described above may also be used to implement the functionality of condition ii). These may use one or more comparators and/or monostables and/or logic gates.

The predetermined time interval $DT_0$ may be set to any desired value. In some examples it may exceed the predetermined time period $DT_1$ in order to allow sufficient time for the electrical pulse from any detected X-ray photon to cause the output 220 of the integrator 210 to exceed the first threshold value $V_1$, should the electrical pulse become sufficiently large.

In some examples, the integrator 210 is discharged under condition ii) only after, i.e. not before, the expiry of an expected time of the output 220 of the integrator 210 reaching the first threshold value $V_1$. The discharge under condition ii) may therefore occur at any time after the expiry of the expected time of the output 220 of the integrator 210 reaching the first threshold value $V_1$. In these examples, the reset circuit 230 discharges the integrator 210 in response to the output 220 of the integrator 210 exceeding the initial threshold value $V_0$ and the output 220 of the integrator 210 not subsequently exceeding the first threshold value $V_1$ within the predetermined time interval $DT_0$ after the initial threshold value $V_0$ is exceeded, only after the expiry of an expected time of the output 220 of the integrator 210 reaching the first threshold value $V_1$. The expected time of the output 220 of the integrator 210 reaching the first threshold value $V_1$ represents a time of the output 220 of the integrator 210 reaching the first threshold value $V_1$ for a detected photon having an energy that causes the first threshold value $V_1$ to be exceeded. This prevents discharging the integrator in the event of an electrical pulse that would have caused the output of the integrator to exceed the first threshold value $V_1$. Thus, it avoids premature discharging of the integrator 210.

By way of an example, the initial threshold value $V_0$ may represent an X-ray energy of 1 keV, and the first threshold value $V_1$ may represent an X-ray energy of 10 keV. In some examples, the first threshold value $V_1$ represents a lowest energy limit of a lowest energy bin $V_{ET1}$ of the spectral photon counting detector 120. This permits the comparator that determines whether the first threshold value $V_1$ has been exceeded, to also be used in a comparator circuit 240 that determines whether the X-ray photon energy exceeds a particular threshold value in the spectral photon counting detector.

In another example, the reset circuit 230 periodically samples the output 220 of the integrator 210 in order to determine whether condition ii) is met. In this implementation, in addition to the discharging of the integrator 210 under condition i), the reset circuit is further configured to periodically sample the output 220 of the integrator 210; and the reset circuit 230 is further configured to discharge the integrator 210 in response to the output 220 of the integrator 210 exceeding the initial threshold value $V_0$ and the output 220 of the integrator 210 not subsequently exceeding the first threshold value $V_1$ within the predetermined time interval $DT_0$ after the initial threshold value $V_0$ is exceeded, only if the output 220 of the integrator 210 exceeds the initial threshold value $V_0$ for at least a predetermined number of samples within the predetermined time interval $DT_0$ and the output 220 of the integrator 210 does not exceed the first threshold value $V_1$ within the predetermined time interval $DT_0$.

In this example, the discharging of the integrator 210 under condition i) occurs as described above with reference to the symbol $DT_1$ and the comparator symbol with threshold value $V_1$ in FIG. 2. The periodic sampling of the output 220 of the integrator 210 under condition ii) may be implemented by using a comparator to monitor the output 220 of the integrator 210, and periodically clocking the logic value at the output of the comparator into a shift register. This comparator has its threshold set at the initial threshold value $V_0$, and it generates a logic 1, if the initial threshold value $V_0$ is exceeded. The output of this comparator is sampled by using a clock to input its value into a shift register with a length NO sample values, e.g. N0=10. The shift register's sample values are inputted to an NO-bit adder, the output of which is compared to an integer threshold representing the predetermined number of samples, i.e. N1, which is less than or equal to N0. The result of this latter comparison triggers the discharging of the integrator 210 upon expiry of the predetermined time interval $DT_0$ if the output 220 of the integrator 210 has exceeded the initial threshold value $V_0$ for at least the predetermined number of samples, i.e. N1 or more. The integrator may be discharged by causing the switch $SW_1$ in FIG. 2 to close. By way of an example, the first time period $DT_1$ may be 20 nanoseconds and the periodic sampling may be performed by taking a sample every 4 nanoseconds. By selecting combinations of N0 and N1, the reset circuit 230 may be optimized to provide low rates of false discharging of the integrator 210. For example, if N0 is set to 10, the discharging may be carried out only if N1=7 or more samples of the output 220 of the integrator 210 exceed the initial threshold value $V_0$. In a further refinement of this example, the discharging may be initiated only if at least a predetermined number of consecutive samples is exceeded. For example, the resetting may be initiated only if at least 7, i.e. 7 or more, consecutive samples of the output 220 of the integrator 210 exceed the initial threshold value $V_0$. The determination of consecutive samples may be performed by using logic gates that monitor the values in the shift register.

The examples in which the reset circuit 230 periodically samples the output 220 of the integrator 210 have the benefit of a reduction in the rate of false discharges of the integrator 210 under condition ii). As mentioned above, offsets at the output of the integrator 210 arise from noise, as well as low energy X-ray photons. Noise tends to have an alternating nature, and the periodic sampling of the output of the integrator reduces the rate of discharging the integrator 210 when its output 220, is only temporarily between the initial threshold value $V_0$ and the first threshold value $V_1$ due to noise.

In some examples, the output 220 of the integrator 210 is coupled to a comparator circuit 240, and the output of the comparator circuit 240 is coupled to a counter circuit 250. As illustrated in FIG. 2, the comparator circuit 240 compares the output 220 of the integrator 210 with a plurality of threshold values $V_{ET1 \ldots ETN}$. The counter circuit 250 determines count values $C_{ET1 \ldots ETN}$ representing a number of times each of the respective plurality of threshold values $V_{ET1 \ldots ETN}$ are exceeded. The count values $C_{ET1 \ldots ETN}$ represent the spectrum of the received X-ray photon(s).

In one example, the time period over which the count values $C_{ET1 \ldots ETN}$ are determined, is set to the period of one X-ray image frame. Thus, in this example, the counter circuit is configured to determine the count values $C_{ET1 \ldots ETN}$ representing a number of times each of the respective plurality of threshold values $V_{ET1 \ldots ETN}$ are exceeded within a period corresponding to an X-ray image frame. In so doing, an X-ray energy spectrum representing the X-ray image frame, is provided.

In some examples, the pulse shaper circuit 200 described above may be included in a spectral photon counting detector. For example, the pulse shaper circuit 200 may be included in the spectral photon counting detector 200 illustrated in FIG. 1. The spectral photon counting detector 120, includes a pixelated array of X-ray detector elements configured to generate electrical pulses in response to received X-ray photons, and each X-ray detector element is electrically coupled to a pulse shaper circuit 200 for integrating the electrical pulses generated by the X-ray detector element. The pixelated array of X-ray detector elements include a direct conversion material that generates an electrical pulse in response to a received X-ray photon. Suitable direct conversion materials include cadmium telluride, cadmium zinc telluride "CZT", silicon, and so forth, although these materials are provided only as examples. The outputs of the pulse shaper circuits 200 may be coupled to one or more comparator circuits 240 and to one or more counter circuits 250 as described in relation to FIG. 2, in order to determine a spectrum of the X-ray photon(s) detected by the X-ray detector elements.

In one example, the above-described spectral photon counting detector 120 is included within a computed tomography or X-ray imaging system. An example of a computed tomography imaging system 100 that includes the spectral photon counting detector 120 is illustrated in FIG. 1. Thereto, the computed tomography or X-ray imaging system 100 includes a spectral photon counting detector 120, and an X-ray source 110. The X-ray source 110 and the spectral photon counting detector 120 are separated by an imaging region 130 for generating X-ray image data representing attenuation of X-rays passing through an object in the imaging region 130 between the X-ray source 110 and the spectral photon counting detector 120.

Figure 5:
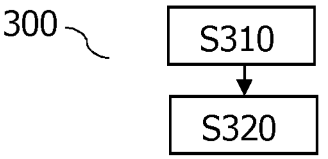
FIG. 5 is a flowchart illustrating an example of a pulse shaping method 300 for use in a spectral photon counting detector 120, in accordance with some aspects of the disclosure.

In another example, a pulse shaping method 300 for use in a spectral photon counting detector 120, is provided. FIG. 5 is a flowchart illustrating an example of a pulse shaping method 300 for use in a spectral photon counting detector 120, in accordance with some aspects of the disclosure. With reference to FIG. 5, the pulse shaping method 300 includes:

integrating S310 an electrical pulse representing a detected photon to generate an integration output value V(t);

resetting S320 the integration output value V(t) a first time period $DT_1$ after the integration output value V(t) exceeds a first threshold value $V_1$; and wherein the resetting S320 further comprises resetting the integration output value V(t) if the integration output value V(t) exceeds an initial threshold value $V_0$, which is lower than the first threshold value $V_1$, and does not subsequently exceed the first threshold value $V_1$ within a predetermined time interval $DT_0$ after the initial threshold value $V_0$ is exceeded.

The pulse shaping method may also include operations that implement other features that are described in relation to the pulse shaper circuit 200, the spectral photon counting detector 120, and the computed tomography or X-ray imaging system. For example, the method may also include operations such as comparing the integration output value V(t) with a plurality of threshold values ($V_{ET1 \ldots ETN}$) representing X-ray energy thresholds, and determining count values ($C_{ET1 \ldots ETN}$) representing a number of times each of the respective plurality of threshold values ($V_{ET1 \ldots ETN}$) are exceeded. The pulse shaping method may also include the operation of generating a spectral image based on the count values generated from a pixelated array of X-ray detector elements. For brevity, not all details of the pulse shaper circuit are duplicated for the pulse shaping method, the spectral photon counting detector, the computed tomography and the X-ray imaging system.

The pulse shaping method may be implemented by a computer. The pulse shaping method may be provided as a non-transitory computer-readable storage medium including computer-readable instructions stored thereon which, when executed by at least one processor, cause the at least one processor to perform the method. In other words, the above-described pulse shaping methods may be implemented in a computer program product. The computer program product can be provided by dedicated hardware or hardware capable of running the software in association with appropriate software. When provided by a processor, the functions of the method features can be provided by a single dedicated processor, by a single shared processor, or by a plurality of individual processors, some of which can be shared. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer usable storage medium or a computer-readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or propagation medium. Examples of computer-readable media include semiconductor or solid-state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

The above examples are to be understood as illustrative of the present disclosure and not restrictive. Further examples are also contemplated. For instance, features described in relation to the examples of the pulse shaper circuit, may also be provided in the spectral photon counting detector, or in the computed tomography or X-ray imaging system, or in the pulse shaping method, in a corresponding manner. It is to be understood that a feature described in relation to any one example may be used alone, or in combination with other described features, and may also be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A pulse shaper circuit for use in a spectral photon counting detector, comprising:

an integrator comprising an output configured to generate an output pulse having an amplitude indicative of an energy of a detected photon; and a reset circuit configured to discharge the integrator a first time period after the output of the integrator exceeds a first threshold value;

wherein the reset circuit is further configured to discharge the integrator when the output of the integrator exceeds an initial threshold value, which is lower than the first threshold value, and does not subsequently exceed the first threshold value within a predetermined time interval starting at a point in time at which the initial threshold value is exceeded.

2. The pulse shaper circuit according to claim 1, wherein the reset circuit is further configured to periodically sample the output of the integrator; and wherein the reset circuit is further configured to discharge the integrator in response to the output of the integrator exceeding the initial threshold value and the output of the integrator not subsequently exceeding the first threshold value within the predetermined time interval after the initial threshold value is exceeded only if the output of the integrator exceeds the initial threshold value for at least a predetermined number of samples within the predetermined time interval and the output of the integrator does not exceed the first threshold value within the predetermined time interval.

3. The pulse shaper circuit according to claim 2, wherein the samples are consecutive samples.

4. The pulse shaper circuit according to claim 1, wherein the reset circuit is further configured to discharge the integrator in response to the output of the integrator exceeding the initial threshold value and the output of the integrator not subsequently exceeding the first threshold value within the predetermined time interval after the initial threshold value is exceeded only after the expiry of an expected time of the output of the integrator reaching the first threshold value, wherein the expected time of the output of the integrator reaching the first threshold value represents a time of the output of the integrator reaching the first threshold value for a detected photon having an energy that causes the first threshold value to be exceeded.

5. The pulse shaper circuit according to claim 1, wherein the first threshold value represents a lowest energy limit of a lowest energy bin of the spectral photon counting detector.

6. The pulse shaper circuit according to claim 1, wherein the first time period represents a time at which the output of the integrator reaches a maximum value.

7. The pulse shaper circuit according to claim 1, comprising a comparator circuit and a counter circuit, wherein the comparator circuit is configured to compare the output of the integrator with a plurality of threshold values, and wherein the counter circuit is configured to determine count values representing a number of times each of the respective plurality of threshold values are exceeded.

8. The pulse shaper circuit according to claim 7, wherein the counter circuit is configured to determine the count values representing a number of times each of the respective plurality of threshold values are exceeded within a period corresponding to an X-ray image frame.

9. The pulse shaper circuit according to claim 1, wherein the integrator comprises a feedback capacitor, and wherein the feedback capacitor is coupled between the output of the integrator and an input of the integrator.

10. The pulse shaper circuit according to claim 1, wherein the reset circuit comprises a switch configured to couple the output of the integrator to an input of the integrator for discharging the integrator.

11. The pulse shaper circuit according to claim 1, wherein the integrator comprises a feedback capacitor, and wherein the reset circuit comprises a current source configured to inject a charge into the feedback capacitor for discharging the integrator.

12. An imaging system, comprising:

a spectral photon counting detector which includes a pulse shaper circuit comprising:

an integrator comprising an output configured to generate an output pulse having an amplitude indicative of an energy of a detected photon; and a reset circuit configured to discharge the integrator a first time period after the output of the integrator exceeds a first threshold value;

wherein the reset circuit is further configured to discharge the integrator when the output of the integrator exceeds an initial threshold value, which is lower than the first threshold value, and does not subsequently exceed the first threshold value within a predetermined time interval starting at a point in time at which the initial threshold value is exceeded; and an X-ray source;

wherein the X-ray source and the spectral photon counting detector are separated by an imaging region for generating X-ray image data representing attenuation of X-rays passing through an object in the imaging region between the X-ray source and the spectral photon counting detector.

13. A pulse shaping method for use in a spectral photon counting detector, comprising:

integrating an electrical pulse representing a detected photon to generate an integration output value; and resetting the integration output value a first time period after the integration output value exceeds a first threshold value;

wherein the resetting further comprises resetting the integration output value when the integration output value exceeds an initial threshold value, which is lower than the first threshold value, and does not subsequently exceed the first threshold value within a predetermined time interval starting at a point in time at which the initial threshold value is exceeded.

* * * * *